E. WEINTRAUB.
METHOD OF PRODUCING PURE ELEMENTS.
APPLICATION FILED MAR. 26, 1918.
1,306,568.
Patented June 10, 1919.
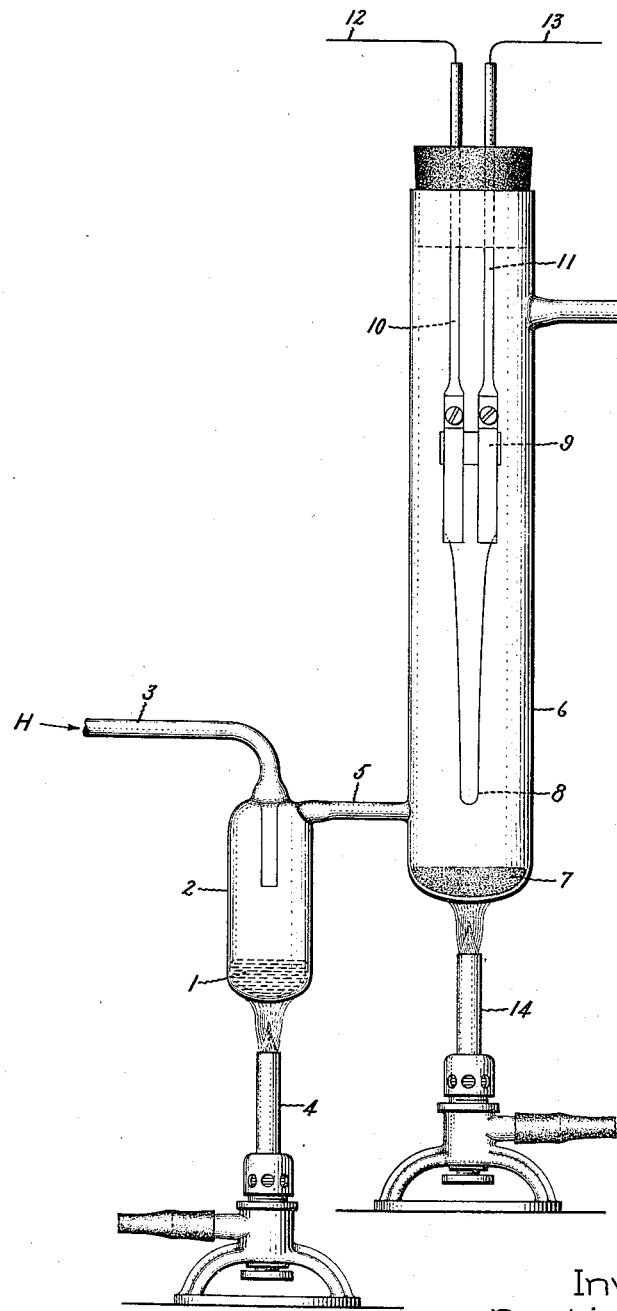
Inventor:
Ezechiel Weintraub,
by Albert G. Davis
His Attorney.

UNITED STATES PATENT OFFICE.

EZECHIEL WEINTRAUB, OF NEW YORK, N. Y., ASSIGNOR TO GENERAL ELECTRIC COMPANY, A CORPORATION OF NEW YORK.

METHOD OF PRODUCING PURE ELEMENTS.

1,306,568. Specification of Letters Patent. Patented June 10, 1919.

Application filed March 26, 1918. Serial No 224,896.

*To all whom it may concern:*

Be it known that I, EZECHIEL WEINTRAUB, a citizen of the United States, residing at New York, in the county of New York, State of New York, have invented certain new and useful Improvements in Methods of Producing Pure Elements, of which the following is a specification.

The present invention relates to the isolation of difficultly reducible elements, such for example, as zirconium, titanium, uranium and beryllium which have heretofore been produced only with the greatest difficulty and from which it has been impossible to remove completely all oxids, nitrids and other impurities.

According to one reduction method employed, these elements have been produced from halogen compounds, using sodium as a reducing agent. As heretofore carried out by heating the reaction mixture in a bomb, this method necessitated a treatment of the reduced element by washing with water in order to remove by-products of the reaction, such, for example. as sodium chlorid. As the reduction has been carried out, under such conditions that the element was largely obtained in a finely divided state, the washing treatment inevitably caused partial oxidation of the metal.

In accordance with my invention, elements are isolated from their compounds by the action of a reducing agent, such, for example, as sodium, potassium, calcium, or the like, and by-products of the reaction are removed by heating the reaction mass either during the reaction or after reduction has occurred to a temperature so high that the by-products are volatilized.

In accordance with one method of carrying out my invention the compound to be reduced, preferably a halid, and vapors of the reducing agent, are brought into contact with an object such as a refractory filament, heated to a temperature above the vaporizing temperature of the reaction by-products, thereby volatilizing by-products and causing the reduced metal to be deposited in a coherent state on the filament. The vapor of sodium, or whatever reducing metal is to be employed, is preferably carried into the reaction zone by a reducing or neutral gas, for example, hydrogen, which will not in itself form any undesired reaction products.

As shown in the drawing, the reducing metal 1 is contained within the receptacle 2 into which is passed by means of a tube 3, a stream of purified hydrogen from which oxygen and water vapor have been carefully removed. When the reducing metal is heated by any suitable means, such, for example, as a gas burner 4 applied to the receptacle 2, the metal is vaporized and is carried over through a tube 5 into another receptacle 6. In this receptacle 6 is provided a quantity of compound 7 to be reduced, for example, a chlorid, or other suitable halid of zirconium, titanium, boron or other element. Located within the receptacle 6 is a fine filament 8 consisting of refractory material, preferably tungsten, although carbon, tantalum, or the like, may also be used. This filament is suspended from a holder 9 and has its terminals connected to leading-in conductors 10 and 11, connected to current conveying conductors 12, 13.

With the filament at bright incandescence, the stream of hydrogen gas from receptacle 2 carrying vapor of sodium, potassium or the like, is caused to mix with vapor of the halogen compound to be reduced by applying heat to receptacle 6 by a suitable heater 14. A gas burner has been shown for illustrative purposes but, of course, any suitable heating means may be used. The mixture of the compound to be reduced and the reducing agent in the vapor state comes into contact with the incandescent filament 8 where reaction takes place. As already stated, the filament 8 is maintained at bright incandescence or at a temperature so high that the sodium chlorid or other by-product of the reaction, which may be formed, is immediately volatilized, but the temperature should not be so high as to appreciably volatilize the reduced element. For example, in the case of zirconium reduction a temperature of about 1600° absolute was found suitable. In some cases the gas stream for carrying the reducing metal may be omitted and the process carried out *in vacuo*.

According to another form of my invention, chlorids or similar compounds of the element to be reduced, are acted upon by alkali metals as formerly, but the resulting product is not purified by leaching with solvents as heretofore, as this treatment inevitably also attacks the reduced metal, which under these conditions is produced in a finely divided state. Instead, in accordance with my invention, the reaction mass is heated in a container of tungsten, boron nitrid, or other suitable refractory material *in vacuo*, or in a gas inert with respect thereto, to a temperature sufficient to vaporize the alkali metal chlorid.

In accordance with the above process such difficultly reducible metals as zirconium, titanium, uranium and beryllium, or the like, have been produced in a substantially chemically pure state, the only admixture being the small amount of tungsten or other metal constituting the filament. As the filament is attenuated and the weight of deposited material may be made large relatively, the impurity in the resulting body of reduced material may be made preferably negligible, easily less than 0.001 of one per cent.

The above described invention is applicable to the reduction of elements such as boron, the halids of which may be reduced with hydrogen alone. The addition of the vapor of sodium, or other reducing metal results in an increased yield.

What I claim as new and desire to secure by Letters Patent of the United States, is:

1. The process of producing substantially pure elementary substance by the action of a reducing metal, such as sodium, on a compound of said substance, which consists in volatilizing by-products of said reaction at an elevated temperature not sufficient to volatilize appreciably the reduced element.

2. The process of obtaining elements by the reducing action of an alkali metal which consists in heating a mixture of a compound of the said element and said reducing metal to a temperature at which reduction occurs and then heating the reaction mass to a temperature sufficient to vaporize the by-products and carrying away said by-products.

3. The process of isolating refractory metals such as zirconium, titanium, uranium and beryllium, which consists in causing reaction between a mixture of a halogen compound of said substances and the vapor of an alkali metal, and volatilizing by-products of said reaction, such as alkali halid.

4. The process of carrying out a reaction between a volatile compound and a vaporizable reducing metal, such as sodium, which consists in bringing a mixture of said substances into contact with an object heated to a temperature above vaporizing temperature of reaction products other than reduced element, thereby producing the element in a pure state on said object and volatilizing impurities.

5. The process of obtaining pure element which consists in conducting a metal vapor of its compound and a vapor capable of reacting therewith into a zone heated to a temperature above the volatilizing temperature of by-products of a reaction between said substances, carrying away said by-products as a vapor and collecting the reduced element.

6. The process of producing substantially pure zirconium, titanium, uranium, beryllium and the like, in filament form, which consists in bringing a mixture of a halogen compound of the desired metal and a vapor of alkali metal into contact with a refractory filament heated to a temperature high enough to produce a deposition of reduced metal on said filament and a volatilization of reaction by-products.

7. The process of producing substantially pure zirconium, titanium, uranium, beryllium and the like, in filamentary form, which consists in bringing a current of pure dry hydrogen containing a halogen compound of a metal to be isolated and a vapor of alkali metal into contact with a refractory filament heated to a temperature high enough to produce a deposition of reduced metal on said filament and a volatilization of reaction by-products.

In witness whereof, I have hereunto set my hand this twentieth day of March, 1918.

EZECHIEL WEINTRAUB.